(12) United States Patent
Qin et al.

(10) Patent No.: US 11,064,499 B2
(45) Date of Patent: Jul. 13, 2021

(54) COMMUNICATION METHOD AND APPARATUS

(71) Applicant: HUAWEI TECHNOLOGIES CO., LTD., Guangdong (CN)

(72) Inventors: Yi Qin, Kista (SE); Hua Li, Shanghai (CN); Zhongfeng Li, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 50 days.

(21) Appl. No.: 16/672,973

(22) Filed: Nov. 4, 2019

(65) Prior Publication Data

US 2020/0068574 A1    Feb. 27, 2020

Related U.S. Application Data

(63) Continuation of application No. PCT/CN2018/085622, filed on May 4, 2018.

(30) Foreign Application Priority Data

May 5, 2017  (CN) .......................... 201710314212.0

(51) Int. Cl.
*H04W 72/04* (2009.01)
*H04L 5/00* (2006.01)
(Continued)

(52) U.S. Cl.
CPC ....... *H04W 72/0493* (2013.01); *H04L 5/0051* (2013.01); *H04W 24/10* (2013.01); *H04W 56/001* (2013.01); *H04W 72/0406* (2013.01)

(58) Field of Classification Search
None
See application file for complete search history.

(56) References Cited

U.S. PATENT DOCUMENTS

| 10,708,933 | B2 * | 7/2020 | Dinan | .................. H04W 76/27 |
| 2013/0242778 | A1 * | 9/2013 | Geirhofer | ............. H04L 1/0027 370/252 |

(Continued)

FOREIGN PATENT DOCUMENTS

| CN | 106470442 A | 3/2017 |
| EP | 2882246 A1 | 6/2015 |
| WO | 2015174616 A1 | 11/2015 |

OTHER PUBLICATIONS

Huawei et al: "QCL indication of downlink control channel and beam management reference signals",3GPP Draft; R1-1700405, Jan. 16, 2017, XP051207942, total 4 pages.

(Continued)

*Primary Examiner* — Kenny S Lin

(57) ABSTRACT

This application provides a communication method and an apparatus, to allocate a resource for wireless transmission between a base station and a terminal. The method includes: determining, by a base station based on a first measurement report, a first resource set that can be used for wireless transmission between the base station and a terminal served by the base station; determining, by the base station based on a second measurement report, a second resource set that can be used for wireless transmission between the base station and the terminal, where the second measurement report is a measurement report currently reported by the terminal; determining, by the base station based on the first resource set and the second resource set, a third resource set that can be used for wireless transmission between the base station and the terminal.

11 Claims, 5 Drawing Sheets

(51) Int. Cl.
*H04W 24/10* (2009.01)
*H04W 56/00* (2009.01)

(56) References Cited

U.S. PATENT DOCUMENTS

| | | | | |
|---|---|---|---|---|
| 2014/0169322 A1* | 6/2014 | Ouchi | ................ | H04W 72/042 |
| | | | | 370/329 |
| 2016/0095131 A1* | 3/2016 | Seo | ................... | H04W 72/0413 |
| | | | | 370/329 |
| 2016/0302203 A1 | 10/2016 | Liu et al. | | |
| 2017/0238330 A1* | 8/2017 | Jiang | ................ | H04W 72/0453 |
| | | | | 370/329 |

OTHER PUBLICATIONS

International Search Report for PCT/CN2018/085622 dated Jul. 11, 2018, 4 pages.

* cited by examiner

COMMUNICATION METHOD AND APPARATUS

CROSS-REFERENCE TO RELATED APPLICATIONS

This application is a continuation of International Application No. PCT/CN2018/085622, filed on May 4, 2018, which claims priority to Chinese Patent Application No. 201710314212.0, filed on May 5, 2017. The disclosures of the aforementioned applications are hereby incorporated by reference in their entireties.

TECHNICAL FIELD

This application relates to the field of communications technologies, and in particular, to the allocation of resources for transmission between network entities, such as, for example, a base station and a terminal.

BACKGROUND

In a 5th generation (5G) communications system, a resource used for wireless transmission between a base station and a terminal needs to be indicated by the base station. A downlink resource indicator is an example of such an indication by the base station. The base station sends a reference signal on a plurality of resources; the terminal selects one or more resources based on a measurement result of the reference signal, and reports a measurement report to the base station, where the measurement report carries an identifier of the selected resource; and the base station indicates a specific resource to be used by the terminal.

The foregoing solution has a limitation that it may be difficult to indicate an appropriate beam in some scenarios.

SUMMARY

This application provides an information transmission method and an apparatus to allocate a resource for wireless transmission between a base station and a terminal.

According to a first aspect, a communication method is provided. The method includes: determining, by a base station based on a first measurement report, a first resource set that can be used for wireless transmission between the base station and a terminal served by the base station, where the first measurement report is a measurement report previously reported by the terminal; determining, by the base station based on a second measurement report, a second resource set that can be used for wireless transmission between the base station and the terminal, where the second measurement report is a measurement report currently reported by the terminal; determining, by the base station based on the first resource set and the second resource set, a third resource set that can be used for wireless transmission between the base station and the terminal, where the third resource set includes some or all of resources of a union set of the first resource set and the second resource set; and sending, by the base station, first downlink indicator information to the terminal, where the first downlink indicator information indicates at least one resource in the third resource set.

In the foregoing solution, the base station determines, by comprehensively using the historical measurement report and the current measurement report, the resource used for wireless transmission between the base station and the terminal, thereby improving quality of the allocated resource.

In a possible implementation: the first measurement report includes at least one resource identifier of the first resource set; and the second measurement report includes at least one resource identifier of the second resource set.

In a possible implementation: the first measurement report includes at least one resource identifier and a measurement value that are of the first resource set; the second measurement report includes at least one resource identifier and a measurement value that are of the second resource set; and the third resource set includes resources whose measurement values are greater than a first threshold in the first resource set and the second resource set, or the third resource set includes resources with one or more optimal measurement values in the first resource set and the second resource set.

In a possible implementation, the method further includes sending, by the base station, second downlink indicator information to the terminal, where the second downlink indicator information indicates the first resource set.

In a possible implementation, the method further includes: determining, by the base station, a first port that has a spatial quasi co-location relationship with a port corresponding to the resource indicated by the first downlink indicator information; and performing, by the base station, wireless transmission with the terminal on the first port.

According to a second aspect, a communication method is provided. The method includes: receiving, by a terminal, first downlink indicator information from a base station, where the first downlink indicator information indicates a first resource set that can be used for wireless transmission between the base station and the terminal; determining, by the terminal based on a resource occupied by a first signal from the base station, a second resource set that can be used for wireless transmission between the base station and the terminal; determining, by the terminal based on the first resource set and the second resource set, a third resource set that can be used for wireless transmission between the base station and the terminal, where the third resource set includes some or all of resources of a union set of the first resource set and the second resource set; and receiving, by the terminal, second downlink indicator information from the base station, where the second downlink indicator information indicates at least one resource in the third resource set.

In the foregoing solution, the resource used for wireless transmission between the base station and the terminal is determined by comprehensively using a historical measurement report and a current measurement report, thereby improving quality of the allocated resource.

In a possible implementation, the second downlink indicator information includes an index of the at least one resource in the third resource set.

In a possible implementation, the first signal includes at least one of the following: a synchronization signal or a reference signal.

In a possible implementation, the method further includes: receiving, by the terminal, third downlink indicator information from the base station, where the third downlink indicator information indicates a first port, and the first port has a spatial quasi co-location relationship with a port corresponding to the at least one resource indicated by the second downlink indicator information.

According to a third aspect, a communication method is provided. The method includes: determining, by a base station based on a resource occupied by a first signal from a terminal, a first resource set that can be used for wireless transmission between the base station and the terminal, where the first signal is a signal previously sent by the terminal; determining, by the base station based on a resource occupied by a second signal from the terminal, a second resource set that can be used for wireless transmission between the base station and the terminal, where the second signal is a signal currently sent by the terminal; determining, by the base station based on the first resource set and the second resource set, a third resource set that can be used for wireless transmission between the base station and the terminal, where the third resource set includes some or all of resources of a union set of the first resource set and the second resource set; and sending, by the base station, first uplink indicator information to the terminal, where the first uplink indicator information indicates at least one resource in the third resource set.

In the foregoing solution, the base station determines, by comprehensively using the signal historically sent by the terminal and the signal currently sent by the terminal, the resource used for wireless transmission between the base station and the terminal, thereby improving quality of the allocated resource.

In a possible implementation, the method further includes: sending, by the base station, second uplink indicator information to the terminal, where the second uplink indicator information indicates the first resource set.

In a possible implementation, the first signal or the second signal includes at least one of the following: a reference signal or a random access preamble sequence.

In a possible implementation, the first uplink indicator information includes an index of the at least one resource in the third resource set.

In a possible implementation, the method further includes: determining, by the base station, a first port that has a spatial quasi co-location relationship with a port corresponding to the resource indicated by the first uplink indicator information; and performing, by the base station, wireless transmission with the terminal on the first port.

According to a fourth aspect, a communication method is provided. The method includes: receiving, by a terminal, first uplink indicator information from a base station, where the first uplink indicator information indicates a first resource set that can be used for wireless transmission between the base station and the terminal; sending, by the terminal, a first signal to the base station on a second resource set that can be used for wireless transmission between the base station and the terminal; determining, by the terminal based on the first resource set and the second resource set, a third resource set that can be used for wireless transmission between the base station and the terminal, where the third resource set is some or all of resources of a union set of the first resource set and the second resource set; and receiving, by the terminal, second uplink indicator information from the base station, where the second uplink indicator information indicates at least one resource in the third resource set.

In the foregoing solution, the resource used for wireless transmission between the base station and the terminal is determined by comprehensively using a signal historically sent by the terminal and a signal currently sent by the terminal, thereby improving quality of the allocated resource.

In a possible implementation, the first signal includes at least one of the following: a reference signal or a random access preamble sequence.

In a possible implementation, the second uplink indicator information includes an index of the at least one resource in the third resource set.

In a possible implementation, the method further includes: receiving, by the terminal, third uplink indicator information from the base station, where the third uplink indicator information indicates a first port, and the first port has a spatial quasi co-location relationship with a port corresponding to the at least one resource indicated by the second uplink indicator information.

According to a fifth aspect, a base station is provided. The base station includes: a processor, configured to determine, based on a first measurement report, a first resource set that can be used for wireless transmission between the base station and a terminal served by the base station, where the first measurement report is a measurement report previously reported by the terminal; further configured to determine, based on a second measurement report, a second resource set that can be used for wireless transmission between the base station and the terminal, where the second measurement report is a measurement report currently reported by the terminal; and further configured to determine, based on the first resource set and the second resource set, a third resource set that can be used for wireless transmission between the base station and the terminal, where the third resource set is some or all of resources of a union set of the first resource set and the second resource set; and a transceiver, configured to send first downlink indicator information to the terminal, where the first downlink indicator information indicates at least one resource in the third resource set.

In the foregoing solution, the base station determines, by comprehensively using the historical measurement report and the current measurement report, the resource used for wireless transmission between the base station and the terminal, thereby improving quality of the allocated resource.

In a possible implementation: the first measurement report includes at least one resource identifier of the first resource set; and the second measurement report includes at least one resource identifier of the second resource set.

In a possible implementation: the first measurement report includes at least one resource identifier and a measurement value that are of the first resource set; the second measurement report includes at least one resource identifier and a measurement value that are of the second resource set; and the third resource set includes resources whose measurement values are greater than a first threshold in the first resource set and the second resource set, or the third resource set includes resources with one or more optimal measurement values in the first resource set and the second resource set.

In a possible implementation: the transceiver is further configured to send second downlink indicator information to the terminal, where the second downlink indicator information indicates the first resource set.

In a possible implementation: the transceiver is further configured to send a first signal to the terminal on a first port, where the first port has a spatial quasi co-location relationship with a port corresponding to the at least one resource indicated by the first downlink indicator information.

According to a sixth aspect, a terminal is provided. The terminal includes a processor and a transceiver, where the transceiver is configured to receive first downlink indicator information from a base station, where the first downlink indicator information indicates a first resource set that can be used for wireless transmission between the base station and the terminal; the processor is configured to determine, based on a resource occupied by a first signal from the base station, a second resource set that can be used for wireless transmission between the base station and the terminal; and further configured to determine, based on the first resource set and the second resource set, a third resource set that can be used for wireless transmission between the base station and the terminal, where the third resource set is some or all of resources of a union set of the first resource set and the second resource set; and the transceiver is further configured to receive second downlink indicator information from the base station, where the second downlink indicator information indicates at least one resource in the third resource set.

In the foregoing solution, the base station determines, by comprehensively using a historical measurement report and a current measurement report, the resource used for wireless transmission between the base station and the terminal, thereby improving quality of the allocated resource.

In a possible implementation: the transceiver is further configured to receive a second signal from the base station on a first port, where the first port has a spatial quasi co-location relationship with a port corresponding to at least one resource indicated by the first downlink indicator information.

In a possible implementation, the second downlink indicator information includes an index of the at least one resource in the third resource set.

In a possible implementation, the first signal includes at least one of the following: a synchronization signal or a reference signal.

According to a seventh aspect, a base station is provided. The base station includes a processor and a transceiver, where the processor is configured to: determine, based on a resource occupied by a first signal from a terminal, a first resource set that can be used for wireless transmission between the base station and the terminal, where the first signal is a signal previously sent by the terminal; determine, based on a resource occupied by a second signal from the terminal, a second resource set that can be used for wireless transmission between the base station and the terminal, where the second signal is a signal currently sent by the terminal; and determine, based on the first resource set and the second resource set, a third resource set that can be used for wireless transmission between the base station and the terminal, where the third resource set is some or all of resources of a union set of the first resource set and the second resource set; and the transceiver is configured to send first uplink indicator information to the terminal, where the first uplink indicator information indicates at least one resource in the third resource set.

In the foregoing solution, the base station determines, by comprehensively using the signal historically sent by the terminal and the signal currently sent by the terminal, the resource used for wireless transmission between the base station and the terminal, thereby improving quality of the allocated resource.

In a possible implementation: the transceiver is further configured to send second uplink indicator information to the terminal, where the second uplink indicator information indicates the first resource set.

In a possible implementation: the first uplink indicator information includes an index of the at least one resource in the third resource set.

In a possible implementation: the transceiver is further configured to receive a third signal of the terminal on a first port, where the first port has a spatial quasi co-location relationship with a port corresponding to the at least one resource indicated by the first uplink indicator information.

According to an eighth aspect, a terminal is provided. The terminal includes a transceiver and a processor, where the transceiver is configured to: receive first uplink indicator information from a base station, where the first uplink indicator information indicates a first resource set that can be used for wireless transmission between the base station and the terminal; and send a first signal to the base station on a second resource set that can be used for wireless transmission between the base station and the terminal; the processor is configured to determine, based on the first resource set and the second resource set, a third resource set that can be used for wireless transmission between the base station and the terminal, where the third resource set is some or all of resources of a union set of the first resource set and the second resource set; and the transceiver is further configured to receive second uplink indicator information from the base station, where the second uplink indicator information indicates at least one resource in the third resource set.

In the foregoing solution, the base station determines, by comprehensively using a signal historically sent by the terminal and a signal currently sent by the terminal, the resource used for wireless transmission between the base station and the terminal, thereby improving quality of the allocated resource.

In a possible implementation: the transceiver is further configured to send the first signal on a first port, where the first port has a spatial quasi co-location relationship with a port corresponding to the at least one resource indicated by the second uplink indicator information.

In a possible implementation: the first signal includes at least one of the following: a reference signal or a random access preamble sequence.

In a possible implementation: the second uplink indicator information includes an index of the at least one resource in the third resource set.

In a possible design, the base station provided in this application may include a corresponding module configured to perform behavior of the network device in the foregoing method design. The module may be software and/or hardware.

In a possible design, the terminal provided in this application may include a corresponding module configured to perform behavior of the terminal in the foregoing method design. The module may be software and/or hardware.

Another aspect of this application provides a computer-readable storage medium. The computer-readable storage medium stores an instruction, and when the instruction is run on a computer, the computer is enabled to perform the methods according to the foregoing aspects.

Another aspect of this application provides a computer program product including an instruction; and when the computer program product is run on a computer, the computer is enabled to perform the methods according to foregoing aspects.

BRIEF DESCRIPTION OF DRAWINGS

To describe the technical solutions in the embodiments of the present invention or in the prior art more clearly, the following briefly describes the accompanying drawings required for describing the embodiments or the prior art.

DESCRIPTION OF EMBODIMENTS

The following describes embodiments of the present invention in detail with reference to the accompanying drawings. A network architecture and a service scenario described in the embodiments are intended to describe the technical solutions in the embodiments more clearly, and do not constitute a limitation on the technical solutions described in this disclosure. A person of ordinary skill in the art may know that: with evolution of the network architecture and emergence of new service scenarios, the technical solutions provided in the embodiments are also applicable to similar technical problems.

Figure 1:
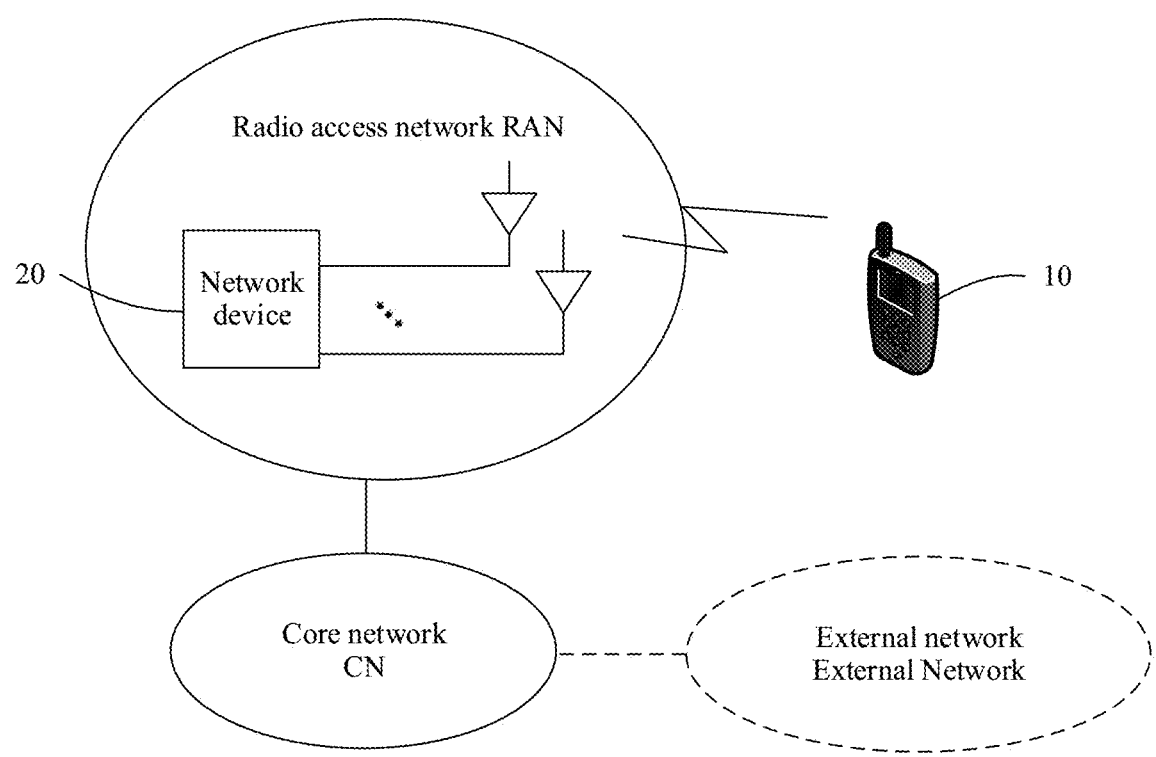
FIG. 1 is a schematic structural diagram of a possible system for implementing an embodiment of the present invention.

FIG. 1 is a schematic diagram of a possible system network according to this application. As shown in FIG. 1, at least one terminal 10 communicates with a radio access network (RAN). The RAN includes at least one network device 20. For clarity, only one network device and one user equipment (UE) are shown in the figure. The RAN is connected to a core network (CN). Optionally, the CN may be coupled to one or more external networks (External Network) such as the Internet and a public switched telephone network (PSTN).

To facilitate understanding, the following describes some nouns used in this application.

In this application, nouns "network" and "system" are usually interchangeably used, but meanings of the nouns may be understood by a person skilled in the art. User equipment (UE) is a terminal device having a communication function, may also be referred to as a terminal, and may include a handheld device, in-vehicle device, wearable device, or computing device that has a wireless communication function, another processing device connected to a wireless modem, or the like. The user equipment may have different names, for example, a terminal, a mobile station, a subscriber unit, a station, a cellular phone, a personal digital assistant, a wireless modem, a wireless communications device, a handheld device, a laptop computer, a cordless phone, and a wireless local loop station, in different networks. For ease of description, in this application, these devices are referred to as user equipment or a terminal. A network device may be a base station (BS), a radio access device in a cloud network, or a device having wireless sending and receiving functions such as a relay station. The base station may also be referred to as a base station device, and is a network device deployed in a radio access network to provide a wireless communication function. The base station may have different names in different radio access systems. For example, the base station is referred to as a NodeB (NodeB) in a universal mobile telecommunications system (UMTS) network, the base station is referred to as an evolved NodeB (evolved NodeB, eNB or eNodeB) in an LTE network, and the base station may be referred to as a transmission/reception node (Transmission Reception Point, TRP), a network node, or a g-NodeB (g-NodeB, gNB) in a 5G system. Optionally, a network device in embodiments may alternatively be user equipment in device-to-device (D2D). Optionally, the network device and the user equipment in embodiments of may alternatively be relay devices, or a network device and user equipment that implement a relay function.

In embodiments of, a channel measurement reference signal (CSI-RS) is a reference signal used for channel measurement, beam measurement, interference measurement, or mobility measurement. A sounding reference signal (SRS) is a reference signal used for channel measurement, beam measurement, interference measurements, or mobility measurement. A demodulation reference signal (DMRS) is a reference channel measurement signal used for demodulation. A physical downlink shared channel (PDSCH) is used for downlink data and signaling transmission. A physical downlink control channel (PDCCH) is used for downlink control information transmission. A physical uplink shared channel (PUSCH) is used for uplink data and signaling transmission. A physical uplink control channel (PUCCH) is used for uplink control information transmission. A synchronization signal (SS) is used to obtain clock synchronization. A physical random access channel (PRACH) or a preamble sequence is used for an uplink access or scheduling request, a beam switching request, or a beam interrupt request. Names of the foregoing channels and signals are not limited to the foregoing names, and may implement a same function but have other names. The foregoing names are merely used as examples.

Figure 2:
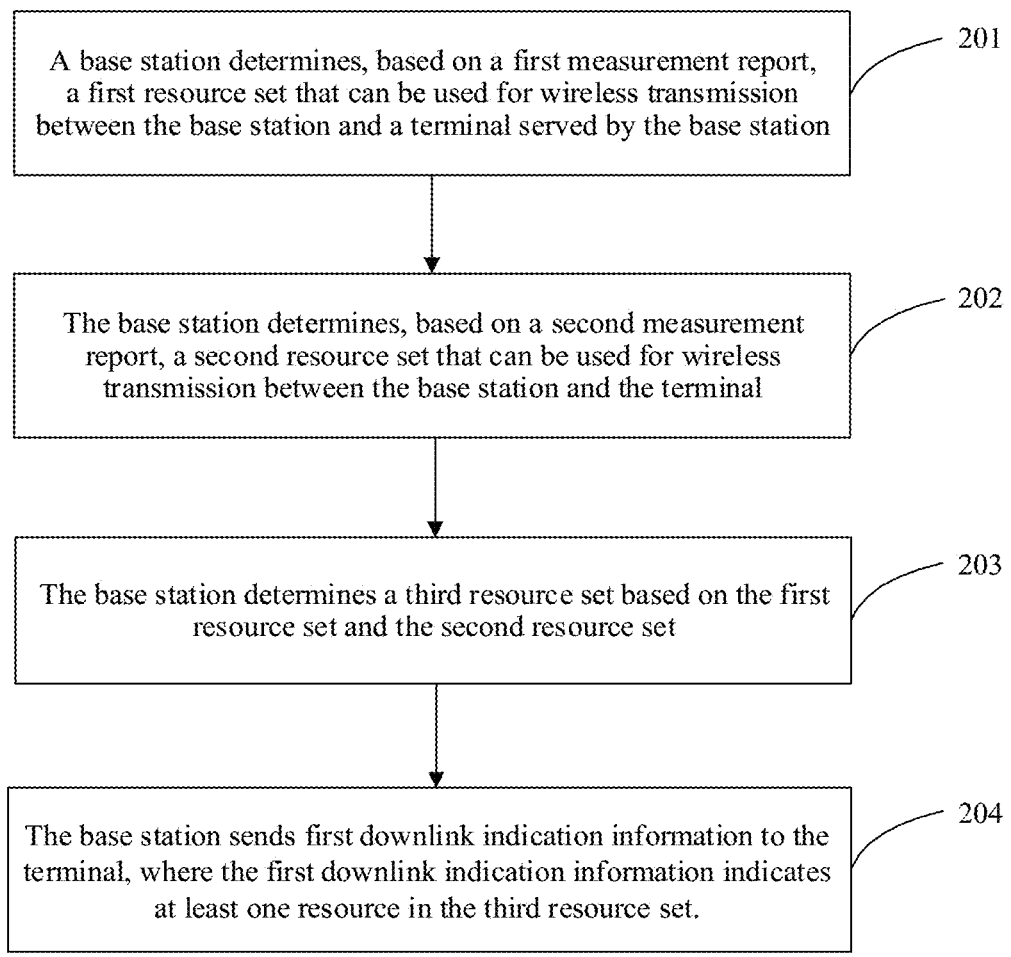
FIG. 2 is a flowchart of a communication method according to an embodiment of the present invention.

An embodiment of the present invention provides a communication method. The method may be applied to the system shown in FIG. 1. The method is described below by using a downlink resource indicator between a base station and a terminal as an example. As shown in FIG. 2, the method includes the following steps.

Step 201: The base station determines, based on a first measurement report, a first resource set that can be used for wireless transmission between the base station and the terminal served by the base station, where the first measurement report is a measurement report previously reported by the terminal.

In this embodiment, the base station may send a signal, such as a primary synchronization signal, a secondary synchronization signal, a downlink demodulation reference signal (DMRS), a CSI-RS, or another reference signal that can be used for mobile measurement, to the terminal on a plurality of resources. The terminal may determine a resource occupied by the signal, receive the signal, and determine a measurement value based on the received signal. The measurement value may include at least one of the following information: a reference signal received power (RSRP), an RSRP quantized value, a channel quality indicator (CQI), a signal to interference plus noise ratio (SINR), an SINR quantized value, a precoding matrix indicator (PMI), a rank indicator (RI), a received signal strength indicator (RSSI), and the like. The terminal may determine, based on information such as the resource occupied by the signal, to report the first measurement report to the base station. When determining the first measurement report, the terminal may select a to-be-reported resource based on the measurement value, for example, select a resource whose measurement value satisfies a preset condition, or select one or more resources with optimal measurement values.

Optionally, the first measurement report may include a resource indicator, such as a CSI-RS resource indicator (CRI), in the plurality of resources, and may further include a measurement value, a reference signal port number such as a CSI-RS port number, and a DMRS quantity. The first measurement report may alternatively include only a measurement value, for example, a scenario in which only one resource is reported. A quantity of reported resources may be specified by the base station or determined by the terminal. Optionally, an indicator of a resource in one first measurement report corresponds to an identifier of the resource in the first measurement report. For example, one CRI corresponds to an identifier of the CRI. Optionally, a measurement value in one first measurement report corresponds to a resource identifier in the first measurement report. For example, one measurement value corresponds to an identifier of the measurement value.

Optionally, all resources in the first resource set may be determined by using the first measurement report. Alternatively, some resources in the first resource set are preset, and the remaining resources are determined by using the first measurement report. For example, it may be predefined that a resource identifier in a first resource set corresponds to a resource received by a terminal by using an omnidirectional beam, and the receiving by using an omnidirectional beam may be not performing weighted processing on signal receiving, or a spatial channel feature for receiving the signal on the resource includes angles of arrival in all directions. For another example, it is predefined that the resource in the first resource set may include a synchronization signal resource corresponding to a PRACH resource sent by the terminal device, and the synchronization signal resource includes at least one of the following: a resource of a primary synchronization signal, a resource of a secondary synchronization signal, a resource of a synchronization signal block, a resource of a broadcast channel corresponding to a synchronization signal, or a CSI-RS resource corresponding to a synchronization signal. The CSI-RS resource corresponding to the synchronization signal, for example, a CSI-RS resource mapped to a same symbol of a synchronization signal or a synchronization signal block, may be configured based on a predefined correspondence or a correspondence configured by the base station.

In the method, that a first resource set includes a resource or a resource identifier in one or more first measurement reports may be understood as that the first resource set is a subset of a union set of the one or more first measurement reports, or the first resource set includes a subset of a union set of the one or more first measurement reports.

Step 202: The base station determines, based on a second measurement report, a second resource set that can be used for wireless transmission between the base station and the terminal, where the second measurement report is a measurement report currently reported by the terminal.

In this embodiment, the terminal may receive a signal currently sent by the base station. For a specific signal type, refer to the foregoing step. The terminal determines a resource occupied by the signal, receives the signal, and determines a measurement value. For a type of the measurement value, refer to the foregoing step. The terminal may determine, based on information such as the measurement value and the resource occupied by the signal, a second resource set to be reported, generate a second measurement report, and transmit the second measurement report to the base station. Alternatively, the terminal may determine, based on the resource occupied by the signal, the second resource set to be reported, for example, report all resources occupied by the signal.

Optionally, the second measurement report may include a resource indicator, such as a CRI, in the second resource set, and may further include one or more of a measurement value, a reference signal port number such as a CSI port number, and a DMRS quantity. The second measurement report may alternatively include only a measurement value, for example, a scenario in which only one resource is reported. The second measurement report may further include CSI-RS reporting configuration information, such as one or more of a reporting period, a reporting time, and an identifier of a specific reporting occasion. A quantity of reported resources may be specified by the base station or determined by the terminal. Optionally, an indicator of a resource in one second measurement report corresponds to an identifier of the resource in the second resource set. For example, one CRI corresponds to an identifier of the CRI. Optionally, a measurement value in one second measurement report corresponds to a resource identifier in the second resource set. For example, one measurement value corresponds to an identifier of the measurement value.

It should be noted that, in this embodiment, the first measurement report is a measurement report previously reported by the terminal, and the second measurement report is a measurement report currently reported by the terminal. The currently reported measurement report may be a measurement report that is latest reported (i.e. most recently reported) by the terminal, and may be generated by the terminal based on a signal that is latest sent by the base station. The previously reported measurement report may include a measurement report reported before a measurement report that is latest reported, or may include a measurement report that is latest reported. The previously reported measurement report may also be referred to as a historical measurement report.

Step 203: The base station determines a third resource set based on the first resource set and the second resource set, where the third resource set includes some or all of resources of a union set of the first resource set and the second resource set. Optionally, a resource identifier in the third resource set may correspond to one or more resources.

Optionally, when determining the third resource set, the base station may determine, according to a preset rule, whether the third resource set is the first resource set or the second resource set. When determining the third resource set, the base station may alternatively select, based on information such as the measurement value, some resources from the first resource set and/or some resources from the second resource set. For example, the base station selects a resource whose measurement value is greater than a preset threshold, or selects two resources respectively from the two sets; or selects all resources from one set, and selects only one or two resources from the other set; or the third resource set may alternatively include all resources in the first resource set and the second resource set.

Optionally, the terminal may alternatively determine the third resource set based on the first resource set and the second resource set. A specific rule or method for determining the third resource set by the base station and the terminal may be preset, or may be notified by the base station to the terminal by using signaling.

Optionally, the base station may notify, by using the signaling, the terminal of one of the following two cases: the third resource set includes only the first resource set or the third resource set includes only the second resource set; and the third resource set includes a part or all of the first resource set and a part or all of the second resource set. Optionally, when notifying that the third resource set includes a part or all of the first resource set and a part or all of the second resource set, the base station may notify a quantity of elements or an upper limit of a quantity of elements of the first resource set in the third resource set, or a quantity of elements or an upper limit of a quantity of elements of the second resource set in the third resource set.

Optionally, for example, the first resource set includes a resource 1 corresponding to a resource identifier 1 in the first resource set, the first resource set further includes a resource 3 and a resource 4 that correspond to a resource identifier 2 in the first resource set, and the first resource set further includes a resource 5 corresponding to a resource identifier 3 in the first resource set. The second resource set includes a resource 6 corresponding to a resource identifier 1 in the second resource set, and the second resource set further includes a resource 7 and a resource 8 that correspond to a resource identifier 2 in the second resource set.

Optionally, the base station may indicate that the third resource set of a user is the second resource set. In this case, a resource identifier 1 in the third resource set corresponds to the resource 6, and a resource identifier 2 in the third resource set corresponds to the resource 7 and the resource 8. For another example, the base station may indicate that the third resource set of a user is the first resource set. In this case, a resource identifier 1 in the third resource set corresponds to the resource 1, a resource identifier 2 in the third resource set corresponds to the resource 3 and the resource 4, and a resource identifier 3 in the third resource set corresponds to the resource 5. For another example, the base station may indicate that the third resource set of a user is a resource corresponding to the resource identifier 1 in the first resource set and a resource corresponding to the resource identifier 1 in the second resource set. In this case, a resource identifier 1 in the third resource set corresponds to the resource 1, and a resource identifier 2 in the third resource set corresponds to the resource 6.

Optionally, a method for determining a correspondence between a resource identifier in the third resource set and a resource in the first resource set and/or the second resource set may alternatively be predefined. For example, it may be predefined that the third resource set of a user is a resource corresponding to the resource identifier 1 in the first resource set and a resource corresponding to the resource identifier 1 in the second resource set. In this case, a resource identifier 1 in the third resource set corresponds to the resource 1, and a resource identifier 2 in the third resource set corresponds to the resource 6. For another example, it may be predefined that the third resource set includes all resources in the second resource set, and a quantity of resource identifiers in the third resource set may be predefined. When a quantity of resource identifiers in the second resource set is less than the quantity of identifiers in the third resource set, a resource identifier in the third resource set that does not correspond to any resource in the second resource set corresponds to a resource in the first resource set based on a predefined order. In this case, if the quantity of resource identifiers in the third resource set is 3, a resource identifier 1 in the third resource set corresponds to the resource 6, a resource identifier 2 in the third resource set corresponds to the resource 7 and the resource 8, and a resource identifier 3 in the third resource set corresponds to the resource 1.

Optionally, the base station and/or the terminal device may alternatively determine the third resource set based on a spatial quasi co-location relationship between signals mapped to resources in the first resource set and the second resource set. For example, if a signal mapped to a resource x in the first resource set and a signal mapped to a resource y in the second resource set have a spatial quasi co-location relationship, the third resource set includes one of the resource x in the first resource set and the resource y in the second resource set, to be specific, instead of including both the resource x in the first resource set and the resource y in the second resource set. For another example, if a signal mapped to a resource identifier a in the first resource set and a signal mapped to a resource identifier b in the second resource set have a spatial quasi co-location relationship, the third resource set includes one of the resource identifier a in the first resource set and the resource identifier b in the second resource set, and, when the resource identifier a and the resource identifier b are different (e.g. when not in a spatial quasi co-location relationship), the third resource set includes both the resource identifier a in the first resource set and the resource identifier b in the second resource set.

Step 204. The base station sends first downlink indicator information to the terminal, where the first downlink indicator information indicates at least one resource in the third resource set.

Optionally, the first downlink indicator information includes an identifier of the at least one resource in the third resource set.

Optionally, one identifier may correspond to one or more resources. The correspondence may be configured by the base station.

In this embodiment of the present invention, the resource may be a time domain resource, a frequency domain resource, a code resource, or a combination of the foregoing resources, for example, a CSI-RS resource, a synchronization signal resource, or a synchronization signal block resource. Optionally, the resource may alternatively be an indicator or an identifier of a signal resource, for example, a CRI, an identifier of a synchronization signal resource, or an identifier of a synchronization signal block resource. Optionally, the indicator or the identifier of the signal resource may alternatively be an identifier of a beam pair link (BPL), an identifier of a beam, or an identifier of a beam group.

In the foregoing solution, the base station determines, by comprehensively using the historical measurement report and the current measurement report, the resource used for wireless transmission between the base station and the terminal, thereby improving quality of the allocated resource.

In this embodiment of the present invention, optionally, the method further includes:

Optionally, the base station sends second downlink indicator information to the terminal, and the second downlink indicator information indicates the first resource set.

Optionally, the second downlink indicator information may include at least one resource identifier in the first resource set and an identifier of at least one resource or a measurement value in the first measurement report. A resource identifier in one first resource set may correspond to a resource identifier in one or more first measurement reports.

In this embodiment of the present invention, optionally, the method further includes determining, by the base station, a first port that has a spatial quasi co-location QCL (Spatial Quasi Co-located) relationship with a port of a signal mapped to the resource indicated by the first downlink indicator information.

Optionally, the base station sends a signal or a channel, the signal is transmitted on the first port, and the first port has the spatial quasi co-location relationship with the port of the signal mapped to the resource indicated by the first downlink indicator information.

Optionally, the first downlink indicator information indicates that there is a correspondence between a resource or a resource identifier in the third resource set and a port of the first port. For example, the first downlink indicator information indicates that a quantity of resources or resource identifiers in the third resource set is the same as a quantity of ports of the first port. For another example, the first downlink indicator information indicates that there is a one-to-one correspondence between a resource or a resource identifier in the third resource set and a port of the first port. For another example, the first downlink indicator information indicates that a resource or a resource identifier in the third resource set corresponds to a plurality of ports of the first port. For another example, the first downlink indicator information indicates that a plurality of resources or a plurality of resource identifiers in the third resource set correspond to one port of the first port, to respectively indicate a beam of each port.

Optionally, in this embodiment, resources corresponding to different resource identifiers in the first resource set may be partially repeated. Optionally, in this embodiment, resources corresponding to different resource identifiers in the third resource set may be partially repeated.

The base station performs wireless transmission with the terminal on the first port. The first port includes one or more ports.

In this embodiment, optionally, there may be no spatial quasi co-location relationship between the first port and the port of the signal mapped to the resource indicated by the first downlink indicator information. For example, there may be a preset mapping relationship between the first port and the port of the signal mapped to the resource indicated by the first downlink indicator information; or beams corresponding to the two ports are associated; or a difference between spatial QCL parameters of the two ports is less than a threshold; or an average value of spatial QCL parameters of ports of a plurality of signals of the first port is the same as a spatial QCL parameter value of the port corresponding to the signal on the resource indicated by the first downlink indicator information.

The method is used to instruct the terminal to determine, based on a receive beam for the signal mapped to the resource indicated by the first downlink indicator information, a beam for a signal or a channel transmitted on the first port. For example, when there is a spatial QCL relationship between the two ports, the terminal receives, by using a same receive beam, the signal or the channel transmitted on the first port. When a difference between the two ports or spatial QCL parameters of the two ports is less than a threshold, the beam used by the terminal to receive the signal or the channel transmitted on the first port is a beam near the receive beam for the signal mapped to the resource indicated by the first downlink indicator information, or the beam used by the terminal to receive the signal or the channel transmitted on the first port is a beam, for example, a beam with a narrower beam width, a beam with a larger gain, or a beam with a larger weighted value, in a range of the receive beam for the signal mapped to the resource indicated by the first downlink indicator information.

Optionally, the relationship between the first port and the port of the signal mapped to the resource indicated by the first downlink indicator information is indicated by the base station.

Optionally, a transmit end spatial channel feature or a receive end spatial channel feature that is included in the spatial QCL relationship is indicated by the base station, or is determined based on the signal transmitted on the first port. For example, when the signal transmitted on the first port is a CSI-RS, the spatial QCL relationship is the transmit end spatial channel feature, or the spatial QCL relationship is the transmit end spatial channel feature or the receive end spatial channel feature and needs to be indicated by the base station. For example, when the signal transmitted on the first port is an SRS, the spatial QCL relationship is the receive end spatial channel feature, or the spatial QCL relationship is the transmit end spatial channel feature or the receive end spatial channel feature and needs to be indicated by the base station. For example, when the signal transmitted on the first port is a downlink DMRS, the spatial QCL relationship includes the receive end spatial channel feature. For example, when the signal transmitted on the first port is an uplink DMRS, the spatial QCL relationship includes the transmit end spatial channel feature.

Optionally, the spatial QCL relationship means that a same parameter exists in signals corresponding to antenna ports of the signals; or the QCL relationship means that the terminal may determine, based on a parameter of an antenna port, a parameter of an antenna port having the QCL relationship with the antenna port; or the QCL relationship means that two antenna ports have a same parameter; or the QCL relationship means that a difference between parameters of two antenna ports is less than a threshold. The parameter may be at least one of delay spread, Doppler spread, a Doppler frequency shift, an average delay, an average gain, an angle of arrival (AOA), an average AOA, AOA spread, an angle of departure (AOD), an average angle of departure AOD, AOD spread, a receive antenna spatial correlation parameter, a transmit antenna spatial correlation parameter, a transmit beam, a receive beam, and a resource identifier. The beam includes at least one of the following: precoding, a weight sequence number, and a beam sequence number. The angles may be decomposition values at different dimensions or a combination of decomposition values at different dimensions. The antenna ports are antenna ports having different antenna port numbers, and/or antenna ports that have a same antenna port number and that are used to send or receive information on different time slots, at different frequencies, and/or in different code domain resources, and/or antenna ports that have different antenna port numbers and that are used to send or receive information on different time slots, at different frequencies, and/or in different code domain resources. The resource identifier includes a resource identifier of a channel state information-reference signal (CSI-RS), or a resource identifier of an SRS, or a resource identifier of a synchronization signal/a synchronization signal block, or a resource identifier of a preamble sequence transmitted on a PRACH, or a resource identifier of a DMRS, and is used to indicate a beam on a resource. For example, a QCL relationship between downlink signals or between uplink signals may be that the two signals may have a same AOA or AOD, to indicate that the two signals have a same receive beam or transmit beam. For another example, a QCL relationship between a downlink signal and an uplink signal or between an uplink signal and a downlink signal may be a correspondence between AOAs and AODs of the two signals, or a correspondence between AODs and AOAs of the two signals, to be specific, an uplink transmit beam may be determined based on a downlink receive beam by using a beam correspondence, or a downlink receive beam may be determined based on an uplink transmit beam by using a beam correspondence.

Optionally, the spatial QCL relationship may alternatively be a corresponding beam relationship between antenna ports, and the beam relationship may include at least one of the following: a same receive beam, a same transmit beam, a transmit beam corresponding to a receive beam, and a receive beam corresponding to a transmit beam.

Optionally, the spatial QCL relationship may alternatively be a corresponding BPL relationship between antenna ports, and may include at least one of the following: a same downlink BPL, a same uplink BPL, an uplink BPL corresponding to a downlink BPL, and a downlink BPL corresponding to an uplink BPL.

Optionally, the terminal may determine a finally used port according to a similar rule.

The first port may be configured to transmit at least one of the following: a CSI-RS, a DMRS, a synchronization signal, a PDSCH, a PDCCH, an SRS, and a preamble sequence. The DMRS is a DMRS of a PDSCH, or a DMRS of a PDCCH, or a DMRS of a PUSCH, or a DMRS of a PUCCH. The CSI-RS may be a non-zero power CSI-RS, or may be a zero power CSI-RS.

Optionally, the indicator information of the base station may be carried by using various signaling, for example, media access control control element (MAC CE) signaling, radio resource control (RRC) signaling, downlink control information (DCI), a system message, or a broadcast message, or may be a combination thereof. For example, an indicator information candidate set is configured by using the RRC signaling, and the DCI indicates an element in the set; or an indicator information candidate set is configured by using the RRC signaling, the MAC CE signaling indicates an indicator information candidate subset thereof, and the DCI indicates an element in the set. The indicator information of the base station includes the first downlink indicator information or the second downlink indicator information, and further include the foregoing other configuration information that needs to be configured by the base station. Different indicator information may be carried in different manners. Optionally, when the indicator information is carried in signaling other than the DCI, the indicator information further includes an effective time and/or an ineffective time of the indicator information.

Optionally, the DCI may be DCI scrambled by using a user-specific radio network temporary identifier (RNTI), or scrambled by using a cell-specific RNTI, or scrambled by using a predefined RNTI, or scrambled by using a beam group or user group RNTI.

Optionally, for the DCI scrambled by using the beam group or user group RNTI, a user determines the beam group or user group RNTI based on a sent preamble sequence or PRACH resource or transmission opportunity.

Optionally, for the DCI scrambled by using the beam group or user group RNTI, bits in the DCI are classified into more than one group. Indicator information of the base station for the user is carried in one or more bit groups. The base station indicates a bit group to which the user belongs, for example, indicates a number of a bit group to which the user belongs. Optionally, the DCI scrambled by using the beam group or user group RNTI is carried on a PDCCH. It is predefined that there is a spatial QCL relationship between a DMRS of the PDCCH carrying the DCI scrambled by using the beam group or user group RNTI and a DMRS of a user-specific PDCCH. Optionally, there is a spatial QCL relationship between the DMRS of the PDCCH carrying the DCI scrambled by using the beam group or user group RNTI and a first synchronization signal, a resource of the first synchronization signal is determined by using the beam group or user group RNTI, the first synchronization signal may be a primary synchronization signal, a secondary synchronization signal, or a DMRS of a broadcast channel corresponding to a synchronization signal, and optionally, the resource of the first synchronization signal may alternatively be a synchronization signal block.

Optionally, the second measurement report in the foregoing step 202 may alternatively not be a currently reported measurement report. In this case, in step 204, the first downlink indicator information is further used to indicate an identifier of a CSI-RS reporting configuration, used to indicate a reported measurement report corresponding to the second measurement report in step 202.

Optionally, only steps 201 and 204 may be used. In this case, the first downlink indicator information in step 204 is used to indicate a resource in the first resource set or a resource identifier in the first resource set. In this case, the third resource set may be understood as the first resource set in the embodiment in step 204.

Optionally, only steps 202 and 204 may be used. In this case, the first downlink indicator information in step 204 is used to indicate a resource in the second resource set or a resource identifier in the second resource set. In this case, the third resource set may be understood as the second resource set in the embodiment in step 204.

Figure 3:
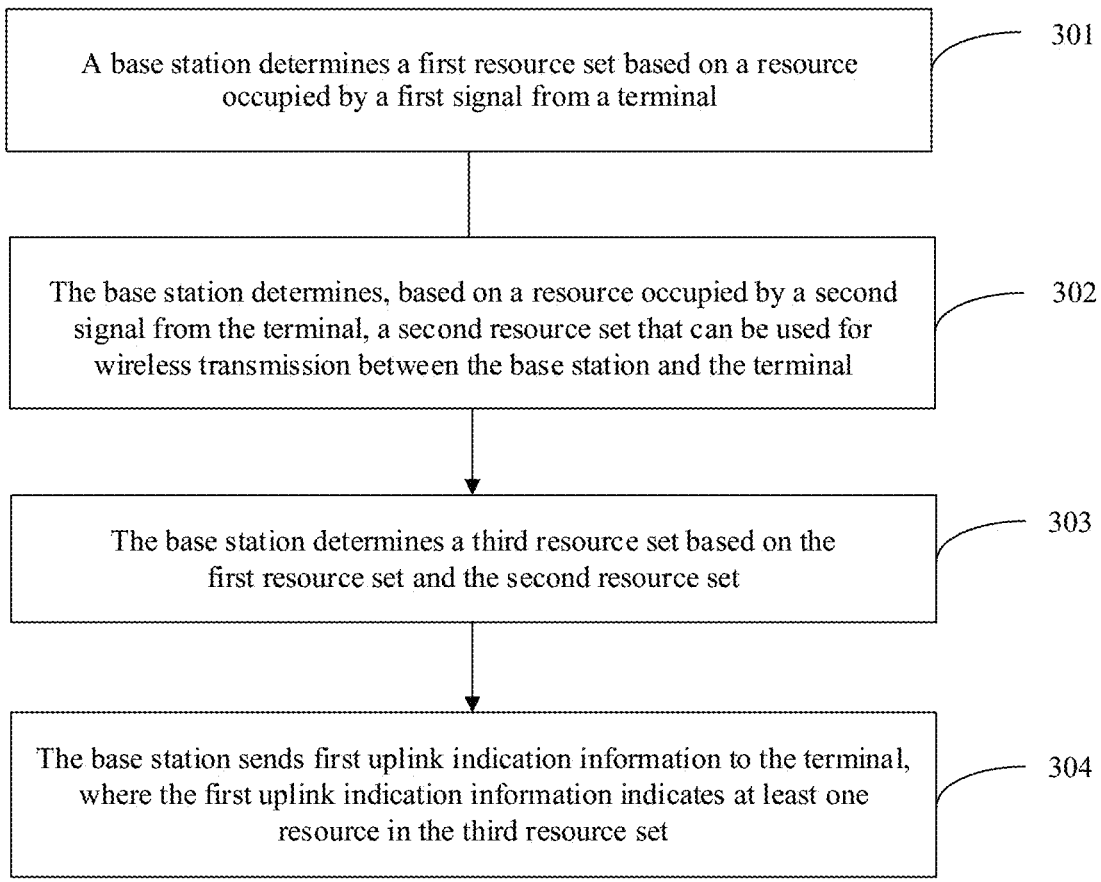
FIG. 3 is a flowchart of another communication method according to an embodiment of the present invention.

A communication method provided in this embodiment of the present invention is further described by using an uplink resource indicator between a base station and a terminal as an example. The method may be applied to the system shown in FIG. 1. As shown in FIG. 3, the method includes the following steps.

Step 301: The base station determines a first resource set based on a resource occupied by a first signal from the terminal, where the first signal is a signal previously sent by the terminal.

Optionally, the terminal may send the first signal to the base station on a plurality of resources. The first signal may be a reference signal, such as an SRS or an uplink DMRS, or a random access preamble sequence. The base station may measure the first signal to obtain a measurement value, and select one or more resources based on information such as the measurement value to form the first resource set. Alternatively, the base station determines the first resource set according to another principle, for example, based on a spatial feature or interference. The measurement value may include at least one of the following information: a reference signal received power RSRP, an RSRP quantized value, a channel quality indicator CQI, a signal to interference plus noise ratio SINR, an SINR quantized value, a precoding matrix indicator PMI, a rank indicator RI, and the like.

Optionally, all resources in the first resource set may be determined by using the first signal. Alternatively, some resources in the first resource set are preset, and remaining resources are determined by using the first signal. For example, a resource identifier in the first resource set corresponds to a resource of a PRACH or a preamble sequence sent by the terminal device.

Optionally, when the first signal is an SRS, a resource of the SRS includes X ports, where X is greater than or equal to 1, and the X ports have a spatial QCL relationship. A plurality of SRS resources form an SRS resource set. By default, there is no spatial QCL relationship between SRS ports mapped to different SRS resources in the SRS resource set. Optionally, a method for predefining whether there is a spatial QCL relationship between the SRS ports in the SRS resource or the SRS ports in the resource set may be independent of step 301.

In the method, that the first resource set includes a resource or a resource identifier in one or more first measurement reports may be understood as that the first resource set is a subset of a union set of one or more first measurement reports, or the first resource set includes a subset of a union set of the one or more first measurement reports.

Step 302: The base station determines, based on a resource occupied by a second signal from the terminal, a second resource set that can be used for wireless transmission between the base station and the terminal, where the second signal is a signal currently sent by the terminal.

Optionally, the terminal may send the second signal to the base station on a plurality of resources, and the second signal may be a reference signal, such as an SRS or an uplink DMRS, or a random access preamble sequence. The base station may measure the second signal.

The base station may measure the second signal to obtain a measurement value.

It should be noted that, in this embodiment, the first signal is a signal previously sent by the terminal, and the second signal is a signal currently sent by the terminal. The currently sent signal may be a signal sent by the terminal at a latest time (i.e. most recently). The previously sent signal may include a signal that is sent before a signal sent at the latest time, or may include a signal sent at the latest time. The previously sent signal may be referred to as a historical sent signal.

Step 303: The base station determines a third resource set based on the first resource set and the second resource set, where the third resource set is some or all of the resources of a union set of the first resource set and the second resource set.

Optionally, a resource identifier in the third resource set may correspond to one or more resources.

Optionally, when determining the third resource set, the base station may determine, according to a preset rule, whether the third resource set is the first resource set or the second resource set. When determining the third resource set, the base station may alternatively select, based on information such as the measurement value, some resources from the first resource set and/or some resources from the second resource set. For example, the base station selects a resource whose measurement value is greater than a preset threshold, or selects two resources respectively from the two sets; or selects all resources from one set, and selects only one or two resources from the other set; or the third resource set may alternatively include all resources in the first resource set and the second resource set.

Optionally, the terminal may alternatively determine the third resource set based on the first resource set and the second resource set. A specific rule or method for determining the third resource set by the base station and the terminal may be preset, or may be notified by the base station to the terminal by using signaling.

Optionally, the base station may notify, by using the signaling, the terminal of one of the following two cases: the third resource set includes only the first resource set or the third resource set includes only the second resource set; and the third resource set includes a part or all of the first resource set and a part or all of the second resource set.

Optionally, when notifying that the third resource set includes a part or all of the first resource set and a part or all of the second resource set, the base station may notify a quantity of elements or an upper limit of a quantity of elements of the first resource set in the third resource set, or a quantity of elements or an upper limit of a quantity of elements of the second resource set in the third resource set.

Optionally, for example, the first resource set includes a resource 1 corresponding to a resource identifier 1 in the first resource set, the first resource set further includes a resource 3 and a resource 4 that correspond to a resource identifier 2 in the first resource set, and the first resource set further includes a resource 5 corresponding to a resource identifier 3 in the first resource set. The second resource set includes a resource 6 corresponding to a resource identifier 1 in the second resource set, and the second resource set further includes a resource 7 and a resource 8 that correspond to a resource identifier 2 in the second resource set.

Optionally, the base station may indicate that the third resource set of a user is the second resource set. In this case, a resource identifier 1 in the third resource set corresponds to the resource 6, and a resource identifier 2 in the third resource set corresponds to the resource 7 and the resource 8. For another example, the base station may indicate that the third resource set of a user is the first resource set. In this case, a resource identifier 1 in the third resource set corresponds to the resource 1, a resource identifier 2 in the third resource set corresponds to the resource 3 and the resource 4, and a resource identifier 3 in the third resource set corresponds to the resource 5. For another example, the base station may indicate that the third resource set of a user is a resource corresponding to the resource identifier 1 in the first resource set and a resource corresponding to the resource identifier 1 in the second resource set. In this case, a resource identifier 1 in the third resource set corresponds to the resource 1, and a resource identifier 2 in the third resource set corresponds to the resource 6.

Optionally, a method for determining a correspondence between a resource identifier in the third resource set and a resource in the first resource set and/or the second resource set may alternatively be predefined. For example, it is predefined that the third resource set of a user is a resource corresponding to the resource identifier 1 in the first resource set and a resource corresponding to the resource identifier 1 in the second resource set. In this case, a resource identifier 1 in the third resource set corresponds to the resource 1, and a resource identifier 2 in the third resource set corresponds to the resource 6. For another example, it is predefined that the third resource set includes all resources in the second resource set, and a quantity of resource identifiers in the third resource set is predefined. When a quantity of resource identifiers in the second resource set is less than the quantity of identifiers in the third resource set, a resource identifier in the third resource set that does not correspond to any resource in the second resource set corresponds to a resource in the first resource set based on a predefined order. In this case, if the quantity of resource identifiers in the third resource set is 3, a resource identifier 1 in the third resource set corresponds to the resource 6, a resource identifier 2 in the third resource set corresponds to the resource 7 and the resource 8, and a resource identifier 3 in the third resource set corresponds to the resource 1.

Optionally, the base station and/or the terminal device may alternatively determine the third resource set based on a spatial quasi co-location relationship between signals mapped to resources in the first resource set and the second resource set. For example, if a signal mapped to a resource x in the first resource set and a signal mapped to a resource y in the second resource set have a spatial quasi co-location relationship, the third resource set includes one of the resource x in the first resource set and the resource y in the second resource set, and to be specific, when the resource x and the resource y are different (e.g. does not have a spatial quasi co location relationship), the third resource set includes both the resource x in the first resource set and the resource y in the second resource set. For another example, if a signal mapped to a resource identifier a in the first resource set and a signal mapped to a resource identifier b in the second resource set have a spatial quasi co-location relationship, the third resource set includes one of the resource identifier a in the first resource set and the resource identifier b in the second resource set, and, when the resource identifier a and the resource identifier b are different, the third resource set includes both the resource identifier a in the first resource set and the resource identifier b in the second resource set.

Step 304: The base station sends first uplink indicator information to the terminal, where the first uplink indicator information indicates at least one resource in the third resource set.

Optionally, the first uplink indicator information includes an identifier of the at least one resource in the third resource set.

Optionally, one identifier may correspond to one or more resources. The correspondence may be configured by the base station.

In this embodiment, the resource may be a time domain resource, a frequency domain resource, a code resource, a combination of the foregoing resources, or the like, for example, an SRS resource, a preamble sequence, a PRACH resource, or a transmission opportunity. Optionally, the resource identifier may alternatively be an indicator or an identifier of a signal resource, for example, an SRS resource indicator or identifier; or an identifier of a preamble sequence, a PRACH resource, or a transmission opportunity. Optionally, the indicator or the identifier of the signal resource may alternatively be an identifier of a beam pair link BPL (beam pair link), an identifier of a beam, or an identifier of a beam group.

In the foregoing solution, the base station determines, by comprehensively using the signal historically sent by the terminal and the signal currently sent by the terminal, the resource used for wireless transmission between the base station and the terminal, thereby improving quality of the allocated resource.

In this embodiment, optionally, the method further includes: determining, by the base station, a first port that has a spatial quasi co-location relationship with a port of a signal mapped to the resource indicated by the first uplink indicator information.

Optionally, the base station sends a signal or a channel, the signal is transmitted on the first port, and the first port has the spatial quasi co-location relationship with the port of the signal mapped to the resource indicated by the first uplink indicator information.

Optionally, the first uplink indicator information indicates that there is a correspondence between a resource or a resource identifier in the third resource set and a port of the first port. For example, the first uplink indicator information indicates that a quantity of resources or resource identifiers in the third resource set is the same as a quantity of ports of the first port. For another example, the first uplink indicator information indicates that there is a one-to-one correspondence between a resource or a resource identifier in the third resource set and a port of the first port. For another example, the first uplink indicator information indicates that a resource or a resource identifier in the third resource set corresponds to a plurality of ports of the first port. For another example, the first uplink indicator information indicates that a plurality of resources or a plurality of resource identifiers in the third resource set correspond to one port of the first port, to respectively indicate a beam of each port.

Optionally, in this embodiment, resources corresponding to different resource identifiers in the first resource set may be partially repeated. Optionally, in this embodiment, resources corresponding to different resource identifiers in the third resource set may be partially repeated.

The base station performs wireless transmission with the terminal on the first port. The first port includes one or more ports.

In this embodiment, optionally, there may be no spatial quasi co-location relationship between the first port and the port of the signal mapped to the resource indicated by the first uplink indicator information. For example, there is a preset mapping relationship between the first port and the port of the signal mapped to the resource indicated by the first uplink indicator information; or beams corresponding to the two ports are associated; or a difference between spatial QCL parameters of the two ports is less than a threshold; or an average value of spatial QCL parameters of ports of a plurality of signals of the first port is the same as a spatial QCL parameter value of the port corresponding to the signal on the resource indicated by the first uplink indicator information.

The method is used to instruct the terminal to determine, based on a receive beam for the signal mapped to the resource indicated by the first uplink indicator information, a beam for a signal or a channel transmitted on the first port. For example, when there is a spatial QCL relationship between the two ports, the terminal receives, by using a same receive beam, the signal or the channel transmitted on the first port. When a difference between the two ports or spatial QCL parameters of the two ports is less than a threshold, the beam used by the terminal to receive the signal or the channel transmitted on the first port is a beam near the receive beam for the signal mapped to the resource indicated by the first uplink indicator information, or the beam used by the terminal to receive the signal or the channel transmitted on the first port is a beam, for example, a beam with a narrower beam width, a beam with a larger gain, or a beam with a larger weighted value, in a range of the receive beam for the signal mapped to the resource indicated by the first uplink indicator information.

Optionally, the relationship between the first port and the port of the signal mapped to the resource indicated by the first uplink indicator information is indicated by the base station.

In this embodiment of the present invention, optionally, the method further includes:

Optionally, the base station sends second uplink indicator information to the terminal, and the second uplink indicator information indicates the first resource set.

Optionally, the second uplink indicator information may include at least one resource identifier in the first resource set and a resource identifier of at least one first signal. A resource identifier in one first resource set may correspond to a resource identifier of one or more first signals. The first port may be configured to transmit at least one of the following: a CSI-RS, a DMRS, a synchronization signal, a PDSCH, a PDCCH, an SRS, and a preamble sequence. The DMRS is a DMRS of a PDSCH, or a DMRS of a PDCCH, or a DMRS of a PUSCH, or a DMRS of a PUCCH. The CSI-RS may be a non-zero power CSI-RS, or may be a zero power CSI-RS.

Optionally, the first uplink indicator information or the second uplink indicator information may be carried by using various signaling. Refer to the foregoing embodiment for carrying information using various signaling.

Optionally, the second signal in step 302 may alternatively not be a currently sent signal. In this case, in step 304, the first uplink indicator information is further used to indicate an identifier of a resource set of the signal, for example, an identifier of an SRS resource set or an identifier of an SRS resource configuration, used to indicate a signal corresponding to a report that is reported based on the second signal in step 302. For example, the second signal is an SRS sent in a specific occasion.

Optionally, only steps 301 and 304 may be used. In this case, the first uplink indicator information in step 304 is used to indicate a resource in the first resource set or a resource identifier in the first resource set. In this case, the third resource set may be understood as the first resource set in the embodiment in step 304.

Optionally, only steps 302 and 304 may be used. In this case, the first uplink indicator information in step 304 is used to indicate a resource in the second resource set or a resource identifier in the second resource set. In this case, the third resource set may be understood as the second resource set in the embodiment in step 304.

For the foregoing method embodiment:

Optionally, an element in each resource set may be a beam, a beam pair link (BPL), a downlink signal resource (which may include a port number), or an uplink signal resource (which may include a port number).

Optionally, when uplink and downlink beams have reciprocity, a downlink resource may be determined based on an indicated uplink resource, or an uplink resource may be determined based on an indicated downlink resource.

Optionally, the base station may further indicate a beam type. For example, the base station determines a beam at a base station end by using a resource indicator. The terminal determines a terminal beam based on a paired beam or beam group. For example, if the terminal determines a terminal beam by using a resource indicator, the terminal uses a same beam for sending and receiving.

Optionally, the base station may maintain a plurality of first resource sets, for example, including an uplink resource set and a downlink resource set. The terminal may determine a specific set based on a transmission direction. The base station may maintain a plurality of first resource sets, and indicate a specific first resource set to the terminal by using signaling.

The embodiments further provide an apparatus embodiment for implementing steps and methods in the foregoing method embodiments. The methods, steps, technical details, technical effects, and the like in the foregoing method embodiments are also applicable to the apparatus embodiment.

Figure 4:
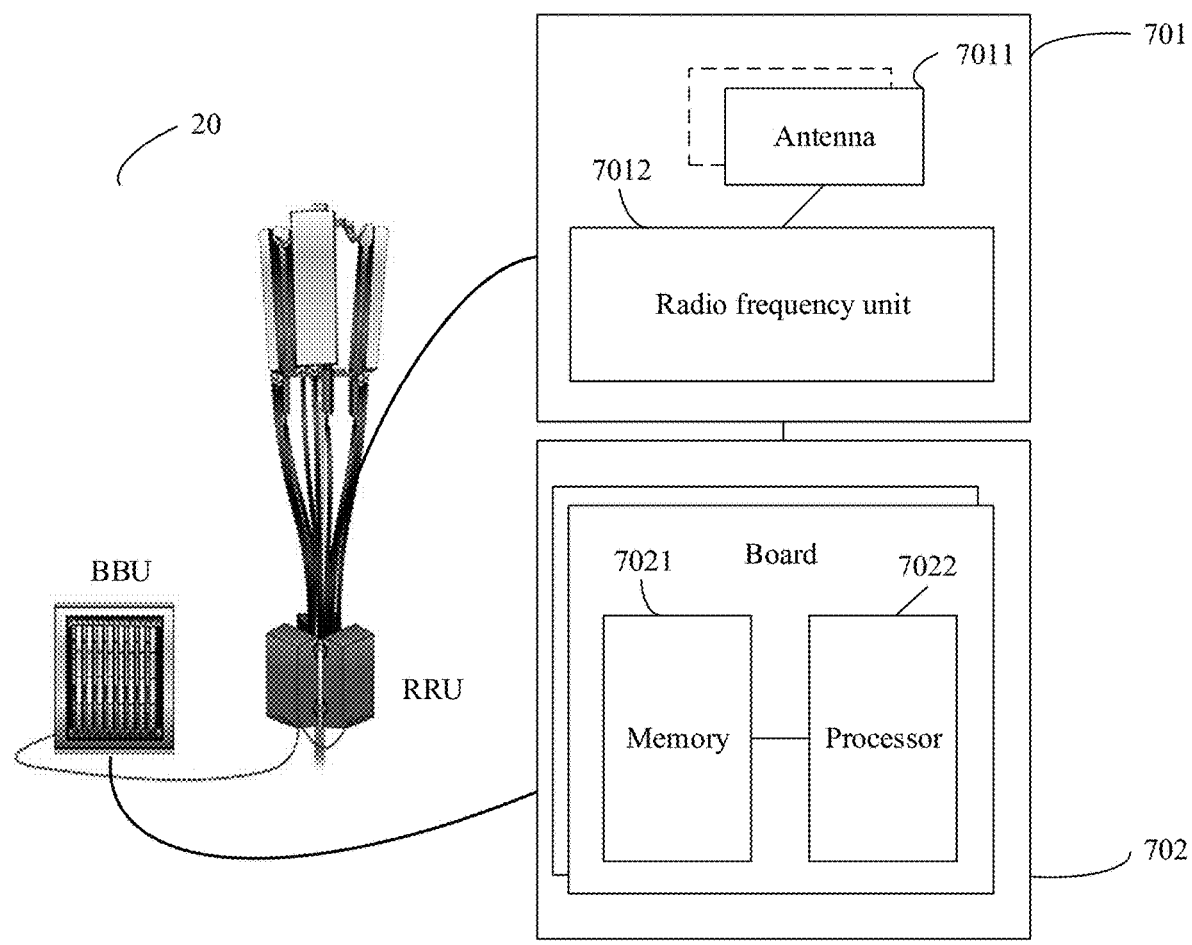
FIG. 4 is a schematic structural diagram of a network device according to an embodiment of the present invention.

FIG. 4 is a schematic structural diagram of a network device. The network device may be applied to the system shown in FIG. 1. A network device 20 includes one or more remote radio units (RRU) 701 and one or more baseband units (BBU) 702. The RRU 701 may be referred to as a transceiver unit, a transceiver machine, a transceiver circuit, a transceiver, or the like, and may include at least one antenna 7011 and a radio frequency unit 7012. The RRU 701 is mainly configured to: send/receive a radio frequency signal, and perform conversion between the radio frequency signal and a baseband signal, for example, configured to send the signaling indicator or the reference signal in the foregoing embodiment to a terminal. The BBU 702 is mainly configured to: perform baseband processing, control the network device, and the like. The RRU 701 and the BBU 702 may be physically disposed together, or may be physically separated, namely, a distributed base station.

The BBU 702 is a control center of the network device, or may be referred to as a processing unit, and is mainly configured to complete baseband processing functions such as channel coding, multiplexing, modulation, and spectrum spreading. In an example, the BBU 702 may include one or more boards, and a plurality of boards may jointly support a radio access network (such as a 5G network) in a single access standard, or may separately support radio access networks in different access standards. The BBU 702 further includes a memory 7021 and a processor 7022. The memory 7021 is configured to store an instruction and data that are necessary. The processor 7022 is configured to control the network device to perform a necessary action. The memory 7021 and the processor 7022 may serve the one or more boards. In other words, a memory and a processor may be disposed on each board; or a plurality of boards may share a same memory and processor. In addition, a necessary circuit is further disposed on each board.

In an actual system, the network device may have a simplified structure, for example, may include only a processor, a transceiver, and the like.

The network device may be configured to implement the method in the foregoing method embodiment, and for the method corresponding to FIG. 2 as follows.

The processor is configured to determine, based on a first measurement report, a first resource set that can be used for wireless transmission between the base station and a terminal served by the base station, where the first measurement report is a measurement report previously reported by the terminal.

The processor may be further configured to determine, based on a second measurement report, a second resource set that can be used for wireless transmission between the base station and the terminal, where the second measurement report is a measurement report currently reported by the terminal; and to determine, based on the first resource set and the second resource set, a third resource set that can be used for wireless transmission between the base station and the terminal, where the third resource set may include some or all of resources of a union set of the first resource set and the second resource set.

The transceiver is configured to send first downlink indicator information to the terminal, and the first downlink indicator information indicates at least one resource in the third resource set.

In this embodiment, the transceiver may be configured to receive the measurement report previously reported by the terminal and the measurement report currently reported by the terminal.

Optionally, the transceiver is further configured to send second downlink indicator information to the terminal, and the second downlink indicator information indicates the first resource set.

Optionally, the transceiver is further configured to send a signal to the terminal on a first port, and the first port has a spatial quasi co-location relationship with a port corresponding to the at least one resource indicated by the first downlink indicator information. The signal may be a downlink reference signal, a PDSCH, or the like.

Optionally, the transceiver is further configured to send third downlink indicator information to the terminal, and the third downlink indicator information indicates the first port.

The network device may be configured to implement the method in the foregoing method embodiment, and for the method corresponding to FIG. 3 as follows.

The processor is configured to: determine, based on a resource occupied by a first signal from a terminal, a first resource set that can be used for wireless transmission between the base station and the terminal, where the first signal is a signal previously sent by the terminal; determine, based on a resource occupied by a second signal from the terminal, a second resource set that can be used for wireless transmission between the base station and the terminal, where the second signal is a signal currently sent by the terminal; and determine, based on the first resource set and the second resource set, a third resource set that can be used for wireless transmission between the base station and the terminal, where the third resource set is some or all of resources of a union set of the first resource set and the second resource set.

The transceiver is configured to send first uplink indicator information to the terminal, and the first uplink indicator information indicates at least one resource in the third resource set.

In this embodiment of the present invention, the transceiver may be configured to receive the first signal and the second signal.

Optionally, the transceiver is further configured to send second uplink indicator information to the terminal, and the second uplink indicator information indicates the first resource set.

Optionally, the transceiver is further configured to receive a signal of the terminal on a first port, and the first port has a spatial quasi co-location relationship with a port corresponding to the at least one resource indicated by the first uplink indicator information. The signal may be an uplink reference signal, a PUSCH, or the like. Optionally, the transceiver is further configured to send third uplink indicator information to the terminal, and the third uplink indicator information indicates the first port.

Figure 5:
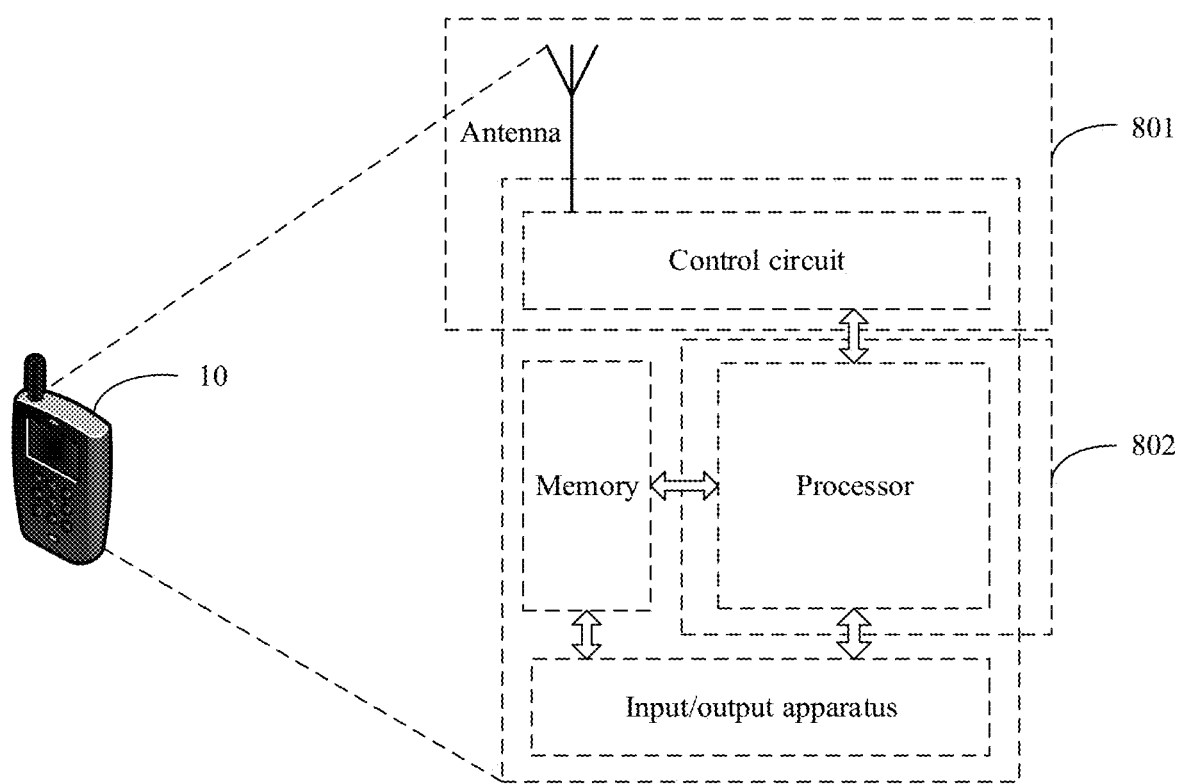
FIG. 5 is a schematic structural diagram of a terminal according to an embodiment of the present invention.

FIG. 5 is a schematic structural diagram of a terminal. The terminal is applicable to the system shown in FIG. 1. For ease of description, FIG. 5 shows only main components of the terminal. As shown in FIG. 5, the terminal 10 includes a processor, a memory, a control circuit or an antenna, and an input/output apparatus. The processor is mainly configured to: process a communication protocol and communication data, control the entire terminal, execute a software program, and process data of the software program. The memory is mainly configured to store a software program and data, for example, store a codebook described in the foregoing embodiment. The control circuit is mainly configured to: perform conversion between a baseband signal and a radio frequency signal, and process the radio frequency signal. A combination of the control circuit and the antenna may also be referred to as a transceiver that is mainly configured to send and receive a radio frequency signal in an electromagnetic wave form. The input/output apparatus, such as a touchscreen, a display, or a keyboard, is mainly configured to: receive data entered by a user, and output data to the user.

After the terminal is powered on, the processor may read the software program from the storage unit, interpret and execute an instruction of the software program, and process the data of the software program. When data needs to be sent in a wireless manner, the processor performs baseband processing on the to-be-sent data, and outputs a baseband signal to a radio frequency circuit. After performing radio frequency processing on the baseband signal, the radio frequency circuit sends a radio frequency signal outward in the electromagnetic wave form by using the antenna. When data is sent to the terminal, the radio frequency circuit receives the radio frequency signal by using the antenna, converts the radio frequency signal into a baseband signal, and outputs the baseband signal to the processor. The processor converts the baseband signal into data, and processes the data.

A person skilled in the art may understand that for ease of description, FIG. 5 shows only one memory and only one processor. Actually, the terminal may include a plurality of processors and a plurality of memories. The memory may also be referred to as a storage medium, a storage device, or the like. This is not limited in this embodiment of the present invention.

In an optional implementation, the processor may include a baseband processor and a central processing unit. The baseband processor is mainly configured to process a communication protocol and communication data, and the central processing unit is mainly configured to: control the entire terminal, execute a software program, and process data of the software program. The processor in FIG. 5 integrates functions of the baseband processor and the central processing unit. A person skilled in the art may understand that the baseband processor and the central processing unit may be separate processors, and are interconnected by using a technology such as a bus. A person skilled in the art may understand that the terminal may include a plurality of baseband processors to adapt to different network standards, and the terminal may include a plurality of central processing units to enhance a processing capability of the terminal. The components of the terminal may be connected by using various buses. The baseband processor may also be expressed as a baseband processing circuit or a baseband processing chip. The central processing unit may also be expressed as a central processing circuit or a central processing chip. A function of processing the communication protocol and the communication data may be embedded into the processor, or may be stored in the storage unit in a form of a software program. The processor executes the software program to implement a baseband processing function.

For example, in this embodiment of the present invention, the antenna and the control circuit that have sending and receiving functions may be considered as a transceiver unit 801 of the terminal 10, and the processor having a processing function may be considered as a processing unit 802 of the terminal 10. As shown in FIG. 5, the terminal 10 includes the transceiver unit 801 and the processing unit 802. The transceiver unit may also be referred to as a transceiver machine, a transceiver, a transceiver apparatus, or the like. Optionally, a component that is in the transceiver unit 801 and that is configured to implement a receiving function may be considered as a receiving unit, and a component that is in the transceiver unit 801 and that is configured to implement a sending function may be considered as a sending unit, in other words, the transceiver unit 801 includes the receiving unit and the sending unit. For example, the receiving unit may also be referred to as a receiver machine, a receiver, a receiver circuit, or the like, and the sending unit may be referred to as a transmitter machine, a transmitter, a transmitter circuit, or the like.

The terminal may be configured to implement the method in the foregoing method embodiment, and for the method corresponding to FIG. 2 as follows.

The transceiver is configured to receive first downlink indicator information from a base station, and the first downlink indicator information indicates a first resource set that can be used for wireless transmission between the base station and the terminal.

The processor is configured to determine, based on a resource occupied by a first signal from the base station, a second resource set that can be used for wireless transmission between the base station and the terminal; and is further configured to determine, based on the first resource set and the second resource set, a third resource set that can be used for wireless transmission between the base station and the terminal, where the third resource set is some or all of resources of a union set of the first resource set and the second resource set.

The transceiver is further configured to receive second downlink indicator information from the base station, and the second downlink indicator information indicates at least one resource in the third resource set.

Optionally, the transceiver is further configured to receive a signal from the base station on a first port, and the first port has a spatial quasi co-location relationship with a port corresponding to the at least one resource indicated by the first downlink indicator information.

Optionally, the transceiver is further configured to receive third downlink indicator information sent by the base station, and the third downlink indicator information indicates the first port.

Optionally, the transceiver is further configured to send third downlink indicator information to the terminal, and the third downlink indicator information indicates the first port.

For the method corresponding to FIG. 2, the terminal shown in FIG. 5 may alternatively implement the foregoing solution in another manner. Details are as follows.

The transceiver is configured to report a first measurement report and a second measurement report to a base station, and the first measurement report is a measurement report previously reported by the terminal, and the second measurement report is a measurement report currently reported by the terminal.

The transceiver is further configured to receive first downlink indicator information from the base station, and the first downlink indicator information indicates at least one resource in a third resource set.

In this embodiment, for other technical details, for example, a method for determining the third resource set, refer to the foregoing method embodiment.

The terminal shown in FIG. 5 may be configured to implement the method in the foregoing method embodiment, and for the method corresponding to FIG. 3 as follows.

The transceiver is configured to: receive first uplink indicator information from a base station, and the first uplink indicator information indicates a first resource set that can be used for wireless transmission between the base station and the terminal; and send a first signal to the base station on a second resource set that can be used for wireless transmission between the base station and the terminal.

The processor is configured to determine, based on the first resource set and the second resource set, a third resource set that can be used for wireless transmission between the base station and the terminal, and the third resource set is some or all of resources of a union set of the first resource set and the second resource set.

The transceiver is further configured to receive second uplink indicator information from the base station, and the second uplink indicator information indicates at least one resource in the third resource set.

Optionally, the transceiver is further configured to send a signal on a first port, and the first port has a spatial quasi co-location relationship with a port corresponding to the at least one resource indicated by the second uplink indicator information. The signal may be an uplink reference signal, a PUSCH, or the like.

Optionally, the transceiver is further configured to receive third uplink indicator information from the base station, and the third uplink indicator information indicates the first port.

For the method corresponding to FIG. 3, the terminal shown in FIG. 5 may alternatively implement the foregoing solution in another manner. Details are as follows.

The transceiver is configured to send a first signal and a second signal to a base station, the first signal is a signal previously sent by the transceiver, and the second signal is a signal currently sent by the transceiver.

The transceiver is further configured to receive first uplink indicator information from the base station, and the first uplink indicator information indicates at least one resource in a third resource set.

In this embodiment, for other technical details, for example, a method for determining the third resource set, refer to the foregoing method embodiment.

It should be noted that numbers such as "first", "second", and "third" in the embodiments of the present invention are merely used to distinguish between a plurality of nouns with a same name in one embodiment, and do not represent an order or a device processing order. Nouns with different numbers in different embodiments may have a same meaning. Nouns with a same number in different embodiments may have different meanings. A specific meaning needs to be determined based on a specific solution.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present invention are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

What is claimed is:

1. A communication method, comprising:
   determining, by a base station and based on a first measurement report, a first resource set of one or more respective resources that can each be used for wireless transmission between the base station and a terminal served by the base station, wherein the first measurement report is a measurement report reported by the terminal;
   determining, by the base station and based on a second measurement report, a second resource set of one or more respective resources that can each be used for wireless transmission between the base station and the terminal, wherein the second measurement report is a measurement report reported by the terminal after the first measurement report is reported;

determining, by the base station and based on the first resource set and the second resource set, a third resource set of one or more respective resources that can each be used for wireless transmission between the base station and the terminal, wherein the third resource set includes some or all of resources of a union set of the first resource set and the second resource set; and sending, by the base station, first downlink indicator information to the terminal, wherein the first downlink indicator information indicates at least one resource in the third resource set.

2. The method according to claim 1, wherein the first measurement report comprises a resource identifier of at least one resource of the first resource set and a measurement value of the at least one resource of the first resource set;

the second measurement report comprises a resource identifier of at least one resource of the second resource set and a measurement value of the at least one resource of the second resource set; and the third resource set comprises resources whose measurement values are greater than a first threshold in the first resource set and the second resource set, or the third resource set comprises resources with one or more optimal measurement values in the first resource set and the second resource set.

3. The method according to claim 1, wherein the method further comprises:

sending, by the base station, second downlink indicator information to the terminal, wherein the second downlink indicator information indicates the first resource set.

4. The method according to claim 1, wherein the method further comprises:

determining, by the base station, a first port that has a spatial quasi co-location relationship with a port corresponding to the at least one resource indicated by the first downlink indicator information; and performing, by the base station, wireless transmission with the terminal on the first port.

5. A base station, comprising:

a processor configured to:
  determine, based on a first measurement report, a first resource set of one or more respective resources that can each be used for wireless transmission between the base station and a terminal served by the base station, wherein the first measurement report is a measurement report reported by the terminal;
  determine, based on a second measurement report, a second resource set of one or more respective resources that can each be used for wireless transmission between the base station and the terminal, wherein the second measurement report is a measurement report reported by the terminal after the first measurement report is reported; and
  determine, based on the first resource set and the second resource set, a third resource set of one or more respective resources that can each be used for wireless transmission between the base station and the terminal, wherein the third resource set includes some or all of resources of a union set of the first resource set and the second resource set; and a transceiver configured to:
  send first downlink indicator information to the terminal, wherein the first downlink indicator information indicates at least one resource in the third resource set.

6. The base station according to claim 5, wherein the first measurement report comprises a resource identifier of at least one resource of the first resource set and a measurement value of the at least one resource of the first resource set;

the second measurement report comprises a resource identifier of at least one resource of the second resource set and a measurement value of the at least one resource of the second resource set; and the third resource set comprises resources whose measurement values are greater than a first threshold in the first resource set and the second resource set, or the third resource set comprises resources with one or more optimal measurement values in the first resource set and the second resource set.

7. The base station according to claim 5, wherein the transceiver is further configured to send second downlink indicator information to the terminal, wherein the second downlink indicator information indicates the first resource set.

8. The method according to claim 5, wherein the transceiver is further configured to send a first signal to the terminal on a first port, wherein the first port has a spatial quasi co-location relationship with a port corresponding to the at least one resource indicated by the first downlink indicator information.

9. A terminal, comprising a processor and a transceiver, wherein the transceiver is configured to receive first downlink indicator information from a base station, wherein the first downlink indicator information indicates a first resource set of respective resources that can each be used for wireless transmission between the base station and the terminal;

the processor is configured to:
  determine, based at least on a resource occupied by a first signal from the base station, a second resource set of one or more respective resources that can each be used for wireless transmission between the base station and the terminal; and
  determine, based at least on the first resource set and the second resource set, a third resource set that can be used for wireless transmission between the base station and the terminal, wherein the third resource set includes some or all of resources of a union set of the first resource set and the second resource set; and the transceiver is further configured to receive second downlink indicator information from the base station, wherein the second downlink indicator information indicates at least one resource in the third resource set.

10. The terminal according to claim 9, wherein the transceiver is further configured to receive a second signal from the base station on a first port, wherein the first port has a spatial quasi co-location relationship with a port corresponding to at least one resource indicated by the first downlink indicator information.

11. The terminal according to claim 9, wherein the first signal comprises at least one of the following: a synchronization signal or a reference signal.

* * * * *